United States Patent
Thurn et al.

(10) Patent No.: US 10,399,710 B2
(45) Date of Patent: Sep. 3, 2019

(54) FLEXIBLE PRESSURE LINE TWIST CAPSULE ROTARY UNION FOR STEERABLE SPACECRAFT RADIATOR

(71) Applicant: The Government of the US, as represented by the Secretary of the Navy, Arlington, VA (US)

(72) Inventors: Adam Thurn, Costa Mesa, CA (US); Philip A. Feerst, Vienna, VA (US); Ronald L. Sutton, Owings, MD (US); Stephen M. Koss, Springfield, VA (US); Robert W. Baldauff, Mechanicsville, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 770 days.

(21) Appl. No.: 15/079,047

(22) Filed: Mar. 24, 2016

(65) Prior Publication Data

US 2017/0101197 A1    Apr. 13, 2017

Related U.S. Application Data

(60) Provisional application No. 62/137,167, filed on Mar. 23, 2015.

(51) Int. Cl.
*B64G 1/50* (2006.01)
*B64G 1/22* (2006.01)

(52) U.S. Cl.
CPC ............. *B64G 1/503* (2013.01); *B64G 1/222* (2013.01)

(58) Field of Classification Search
CPC ........ Y10T 137/6918; Y10T 137/6954; B64G 1/503
See application file for complete search history.

(56) References Cited

U.S. PATENT DOCUMENTS

| 3,496,995 A | * | 2/1970 | Stein | ........................ | B64G 1/50 |
| | | | | | 165/104.21 |
| 3,672,395 A | * | 6/1972 | Fuetsch | ................... | B66F 9/205 |
| | | | | | 137/355.16 |

(Continued)

OTHER PUBLICATIONS

Costulis, J.A.; "Development of a Rotary Joint Fluid Coupling for Space Station Freedom", Technology 2001: The Second National Technology Transfer Conference and Exposition, vol. 2; N92-22689, pp. 119-128, 1991.
Gilmore, D.G.; "Radiators", Spacecraft Thermal Control Handbook, vol. 1, pp. 207-222, 2002.
Hengeveld, D.W.; Braun, J.E.; Groll, E.A.; Williams, A.D.; "Review of Modern Spacecraft Thermal Control Technologies and Their Application to Next-Generation Buildings"; International High Performance Buildings Conference, Jul. 12-15, 2010, 3440, p. 1-8.

(Continued)

*Primary Examiner* — Philip J Bonzell
*Assistant Examiner* — Michael B. Kreiner
(74) *Attorney, Agent, or Firm* — US Naval Research Laboratory; Richard F. Bis

(57) ABSTRACT

A twist capsule rotary joint system for passing a fluid through a pressure hull without a dynamic seal. A rotating cylindrical drum positioned outboard of the pressure hull is adapted to be driven in a reciprocating manner through an angle and backward through the same angle. At least one outboard pressure line or hose has a first end attached to a fixed connector that extends through the pressure hull near and radially outward of the rotating cylindrical drum. A second end of the outboard pressure line or hose is attached to a connector that extends through the top outboard surface of the drum. As the drum rotates, the pressure line wraps around the drum, or unwraps from the drum. In an exemplary embodiment, two pressure lines carry two-phase coolant through the pressure hull of a spacecraft in support of a rotating radiator that is adapted to rotate to present a minimum surface area toward the sun.

2 Claims, 8 Drawing Sheets

(56) References Cited

U.S. PATENT DOCUMENTS

| | | | | |
|---|---|---|---|---|
| 3,949,778 | A * | 4/1976 | Woodford | B67D 7/38 137/355.16 |
| 4,710,131 | A | 12/1987 | Bonenberger | |
| 4,957,157 | A * | 9/1990 | Dowdy | B64G 1/50 165/104.26 |
| 4,986,346 | A * | 1/1991 | Blackmon | B64G 1/503 165/41 |
| 5,794,890 | A * | 8/1998 | Jones, Jr. | B64G 1/503 16/280 |
| 6,443,830 | B1 * | 9/2002 | Vandamme | B64F 1/305 137/355.16 |
| 6,819,854 | B1 | 11/2004 | Young et al. | |
| 6,923,214 | B2 * | 8/2005 | Widegren | B64F 1/28 137/355.26 |
| 8,283,993 | B2 | 10/2012 | Coleman | |
| 8,413,676 | B2 * | 4/2013 | Umizaki | B60K 15/01 137/354 |
| 8,480,423 | B2 | 7/2013 | O'Sullivan et al. | |
| 8,662,103 | B2 * | 3/2014 | Adler | B65H 75/40 137/355.16 |
| 9,146,059 | B2 | 9/2015 | Hoang | |
| 9,315,280 | B2 * | 4/2016 | Ambrose | B64G 1/503 |
| 2011/0183530 | A1 | 7/2011 | Coleman | |

OTHER PUBLICATIONS

Warner, M.A.; "Ammonia Transfer Across Rotating Joints in Space", The 22nd Aerospace Mechanisms Symposium, N88-21492, pp. 341-353, (1988).

Zakar, D.; Amend, C.; Baldauff, R.; Hoang, T.; "Steerable Radiator Concept for Optimal Performance of Spacecraft Thermal Control System", 43rd AIAA Thermophysics Conference, Jun. 25-28, 2012, AIAA 2012-3309, 6 pages.

Hoang, T.; Brown, M.; Baldauff, R.; Cummings, S.; "Development of a Two-Phase Capillary Pumped Heat Transport for Spacecraft Central Thermal Bus", Proceedings of 2003 Space Technology and Applications International Forum, AIP Conference Proceedings, vol. 654, pp. 49-54, Feb. 2003.

Hoang, T., R. Baldauff, and K. Cheung, "Hybrid Two Phase Mechanical/Capillary Pumped Loop for High-Capacity Heat Transport," SAE international Conference on Environmental Systems 2007.

Zakar, D., Baldauff, R., Spencer, S., Hoang, T., and Mahony, D. "Loop Heat Pipe Utilization for Temperature Control fo Electronics Deck", 42nd AIAA Thermophysics Conference, 2011.

* cited by examiner

FLEXIBLE PRESSURE LINE TWIST CAPSULE ROTARY UNION FOR STEERABLE SPACECRAFT RADIATOR

CROSS-REFERENCE TO RELATED APPLICATIONS

This Application claims the benefit of U.S. Provisional Application 62/137,167 filed on Mar. 23, 2015, the entire disclosure of which is incorporated herein in its entirety.

BACKGROUND

1. Technical Field

This application is related to spacecraft radiators, and more specifically, to through-hull connectors for passing coolant through the spacecraft pressure hull.

2. Related Technology

U.S. Pat. No. 7,036,772 to Walker et al., U.S. Pat. No. 6,669,147 to Bertheux et al., U.S. Pat. No. 6,854,510 to Low et al., and U.S. Pat. No. 7,874,520 to McKinnon et al. describe spacecraft with extensible radiators for radiating excess heat.

M. A. Warner, "Ammonia Transfer Across Rotating Joints in Space", The 22nd Aerospace Mechanisms Symposium, N88-21492, pp. 341-353, (1988) describes a rotary fluid transfer coupling design intended for space station radiator use.

J. A. Costulis, "Development of a Rotary Joint Fluid Coupling for Space Station Freedom", Technology 2001: The Second National Technology Transfer Conference and Exposition, Vol. 2; N92-22689, pp. 119-128, 1991, describes NASA evaluation of alternative designs for a rotary joint for carrying ammonia to and from external radiator panels.

D. Zakar, C. Amend, R. Baldauff, T. Hoang, "Steerable Radiator Concept for Optimal Performance of Spacecraft Thermal Control System", 43rd AIAA Thermophysics Conference, 25-28 Jun. 2012, AIAA 2012-3309, 6 pages, describe a proposed steerable radiator for a spacecraft.

Additional information related to spacecraft radiator-based thermal control systems is found in the following documents: Hoang, T., M. Brown, R. Baldauff, and S. Cummings, "Development of a Two-Phase Capillary Pumped Heat Transport for Spacecraft Central Thermal Bus", Proceedings of 2003 Space Technology and Applications International Forum, February 2003; Hoang, T., R. Baldauff, and K. Cheung, "Hybrid Two Phase Mechanical/Capillary Pumped Loop for High-Capacity Heat Transport," SAE International Conference on Environmental Systems 2007; Zakar, D., Baldauff, R., Spencer, S., Hoang, T., and Mahony, D. "Loop Heat Pipe Utilization for Temperature Control of Electronics Deck", 42nd AIAA Thermophysics Conference, 2011; and D. G. Gilmore, "Radiators", Spacecraft Thermal Control Handbook, Vol. 1, pp. 207-222, 2002, each of which is incorporated herein in its entirety.

Twist or rotary mechanisms for transmitting optical or electrical power and signals are disclosed in U.S. Pat. No. 4,710,131 to Bonenberger; U.S. Pat. No. 8,283,993 to D. S. Coleman; U.S. Pat. No. 6,819,854 to Young et al.; U.S. Pat. No. 8,480,423 to O'Sullivan et al.; and US Patent Publication No. 20110183530 to D. S. Coleman.

Some rotary joints intended to allow fluids to pass through the spacecraft hull can leak, or have problems associated with wear or fatigue.

BRIEF SUMMARY

A twist capsule rotary joint system for passing a fluid through a pressure hull without a dynamic seal. A rotating cylindrical drum positioned outboard of the pressure hull is adapted to be driven in a reciprocating manner through an angle and backward through the same angle. At least one outboard pressure line or hose has a first end attached to a fixed connector that extends through the pressure hull near and radially outward of the rotating cylindrical drum. A second end of the outboard pressure line or hose is attached to a connector that extends through the top outboard surface of the drum. As the drum rotates, the pressure line wraps around the drum, or unwraps from the drum.

In an exemplary embodiment, two pressure lines carry two-phase coolant through the pressure hull of a spacecraft in support of a rotating radiator that is adapted to rotate to present a minimum surface area toward the sun.

DETAILED DESCRIPTION

In a spacecraft, electronic components and other devices generate heat. Two phase thermal transfer systems can be used to draw excess heat from the electronics spaces. such as those described in U.S. Pat. No. 9,146,059; Hoang, T. M. Brown, R. Baldauff, and S. Cummings, "Development of a Two-Phase Capillary Pumped Heat Transport for Spacecraft Central Thermal Bus", Proceedings of 2003 Space Technology and Applications International Forum, February 2003; Hoang, T., R. Baldauff, and K. Cheung, "Hybrid Two Phase Mechanical/Capillary Pumped Loop for High-Capacity Heat Transport," SAE International Conference on Environmental Systems 2007; and Zakar, D., Baldauff, R., Spencer, S., Hoang, T., and Mahony, D. "Loop Heat Pipe Utilization for Temperature Control of Electronics Deck", 42nd AIAA Thermophysics Conference, 2011. The entire disclosure of each of these documents is incorporated herein in its entirety.

The two phase heat transfer system can use a working fluid such as ammonia to carry the waste heat to radiators located external to the spacecraft pressure hull. The heated ammonia circulates through the radiators, releasing the heat as infrared radiation and cooling the working fluid.

Figure 1:
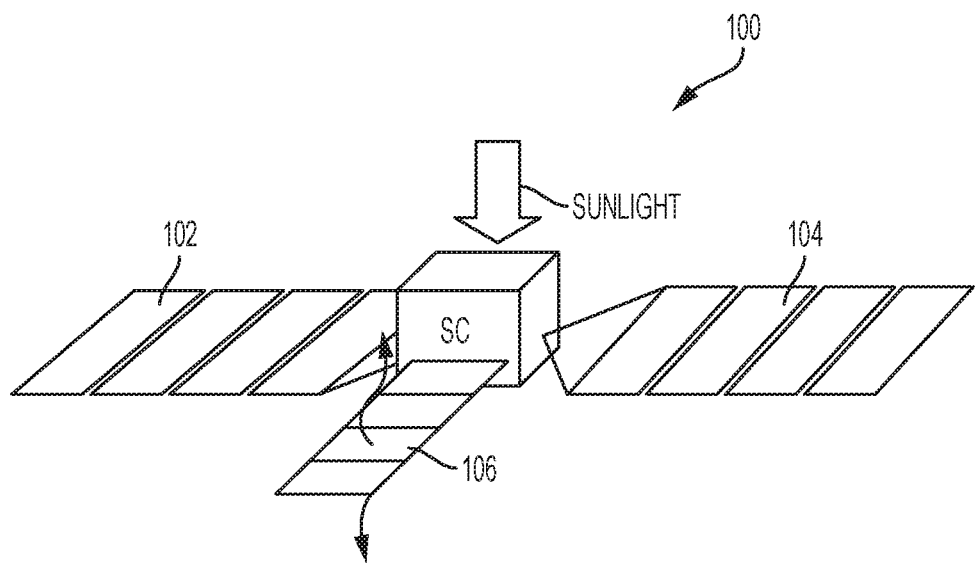
FIG. 1 illustrates a satellite with solar arrays and a radiator positioned in the same plane as the solar arrays.

FIG. 1 illustrates a satellite 100 having two solar arrays 102 and 104 and a radiator 106 positioned in the same plane as the solar arrays. At most sun angles, sunlight reaches a face of the radiator, requiring the radiator to be oversized to compensate for the sun.

Figure 2:
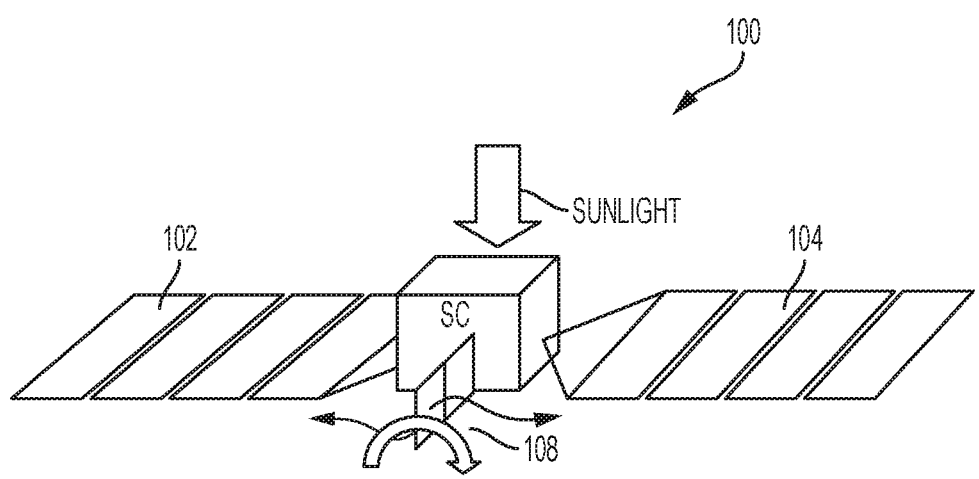
FIG. 2 shows a satellite having two solar panels and a steerable radiator 108.

FIG. 2 shows a satellite having two solar panels and a steerable radiator 108. The radiator extends outward from the satellite, and can be rotated about a longitudinal axis. The radiator can be steered so it points away from the sun (with only an edge facing the sun) at all sun angles. The resulting increase in heat rejection can reduce the necessary size of the radiator, thus reducing the spacecraft mass and allowing more payload to be carried. Thermal analysis has shown that the ability to direct the radiator towards deep space can reduce the size and mass of the radiator by nearly 70%.

An embodiment of the invention is a rotary joint that includes a rotating interface for a steerable spacecraft radiator. The system includes flexible high-pressure fluid-carrying hoses or lines that carry coolant fluid through a connector at the spacecraft pressure hull, and a rotating-drum twist capsule. This design allows the fluid to pass through the pressure hull at a fixed stationary connector. A rotating drum is configured to move one end of each of the flexible pressure hoses through a circular path that keeps the hose free of kinks or twists. Additional embodiments include a steerable radiator that includes the rotary joint, and a spacecraft that includes the rotary joint and the steerable radiator.

By "high pressure hose", it is meant that the fluid carrying line, hose, or member can carry fluid at pressures encountered in spacecraft radiator system in a zero pressure space environment. Further, the high pressure line is one that can operate with some portions at very high temperatures when in direct sunlight and at very cold temperatures when in a shadow. Further details of the high pressure hoses and other components are described below. In this discussion, the terms hoses and lines are used interchangeably.

Figure 3A:
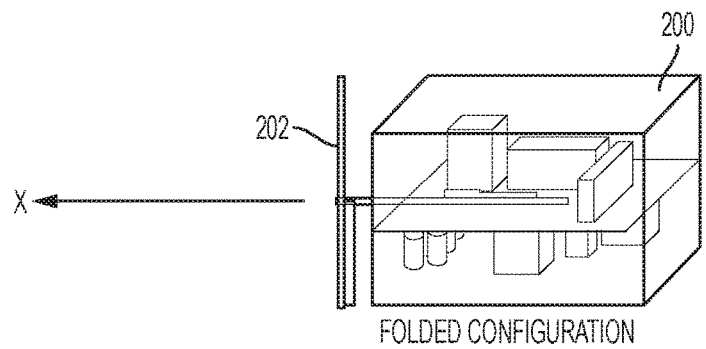
FIGS. 3A-3C illustrates a satellite with a steerable articulated radiator support system that allows the radiator to be steered and to be folded against the spacecraft or extended away from the spacecraft.
Figure 3B:
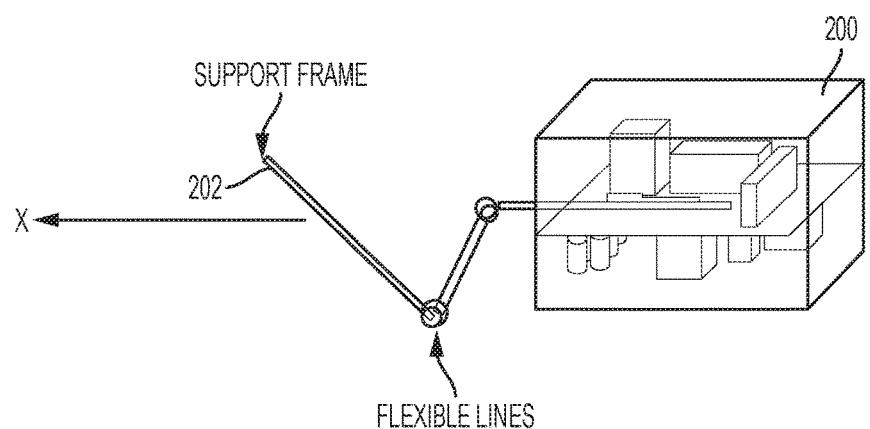
Figure 3C:
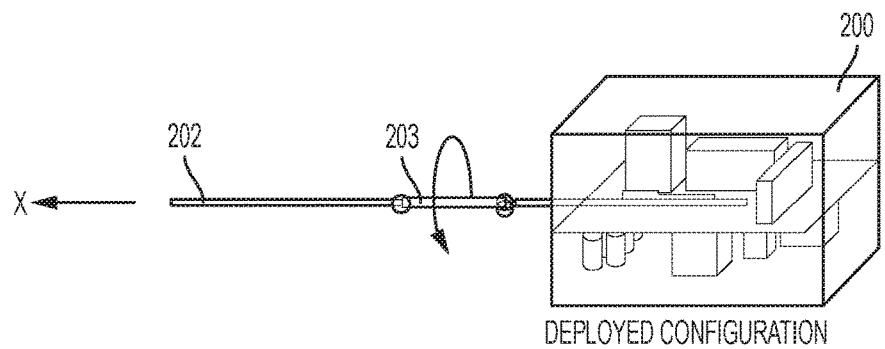

FIGS. 3A-3C illustrate some aspects a steerable articulated radiator support frame. FIG. 3A shows a satellite with a steerable radiator in a folded configuration with the support frame 202 for the radiator folded up against the hull of the spacecraft. FIG. 3B shows the steerable radiator support frame 202 being extended outward from the spacecraft. Note that two controlled mechanized hinges provide one degree of freedom to steer the pointing of the radiator. As seen in FIG. 3C, a rotating joint 203 will provide three degrees of freedom for steering the radiator. For convenience, the outwardly extending axis about which the steerable radiator support frame rotates is designated as x.

Active control of the radiator allows for positioning the radiators in with more ideal view factors throughout an orbit, allowing solar incidence on the radiator to be controlled, and reducing the temperature swing experienced by the radiator.

The overall mass of the radiator will be reduced because the radiator can be steered to maintain a colder infinite sink. The advantage for a steerable radiator over a fixed angle radiator is expected to be maximum for satellites in orbits with a beta angle of 45 degrees. For a satellite in a Beta 45 orbit, the steerable radiator is expected to reduce the necessary mass of the radiator by about 18%. Further, for a satellite in a Beta 45 orbit, the steerable radiator is expected to provide an additional 6 to 8 percent additional power availability on the electronics deck. In addition, spacecraft radiators are normally kept in standby mode with a heater normally powered on in order to keep the temperature of the ammonia coolant above its freezing temperature. A steerable radiator can provide a significant heater power savings of between about 32% and about 85% during standby mode. Note that the beta angle is defined as the angle between the orbital plane of the spacecraft and the vector to the sun.

Figure 4A:
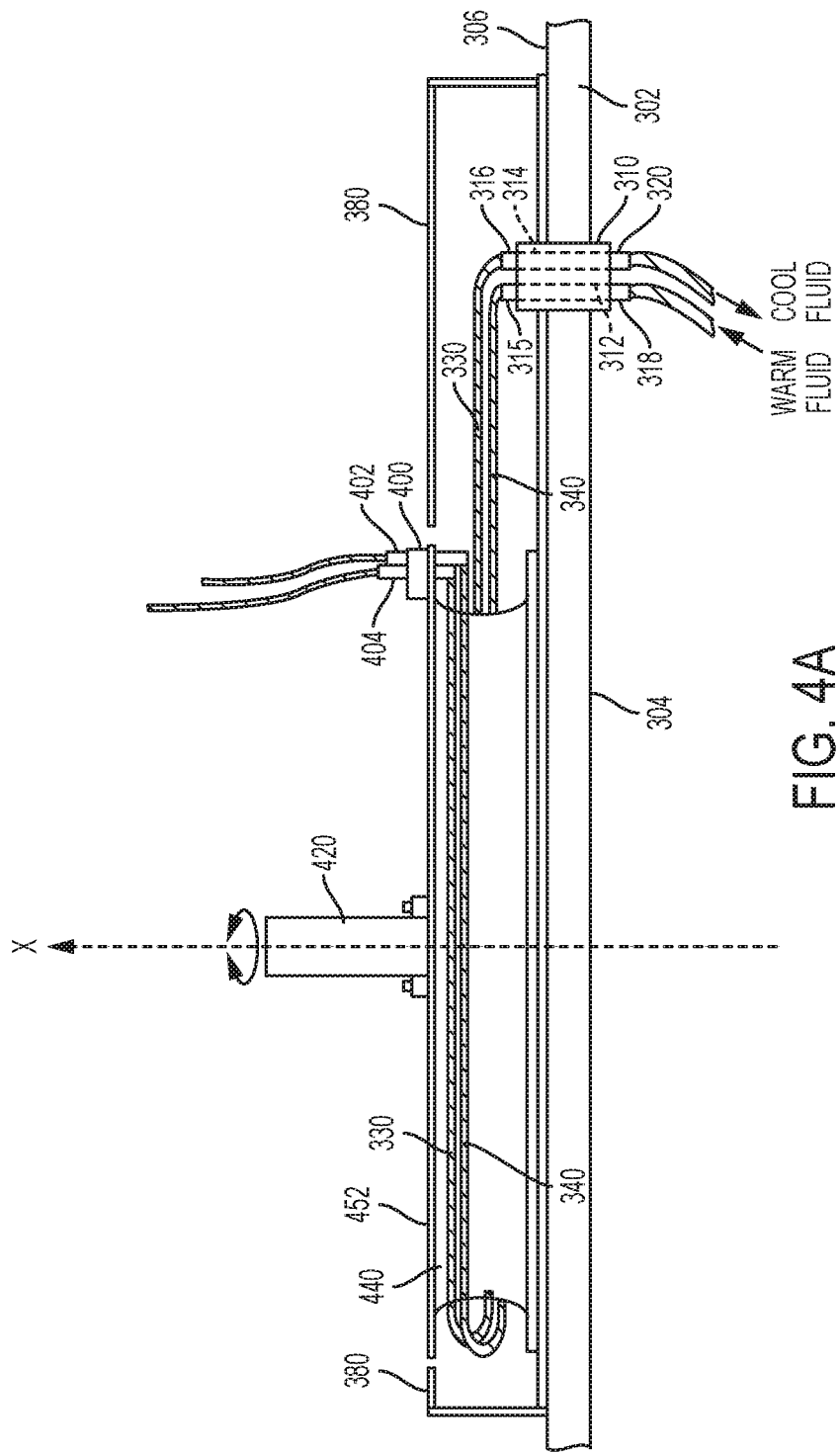
FIGS. 4A-4B illustrate an example of a twist capsule rotary joint.
Figure 4B:
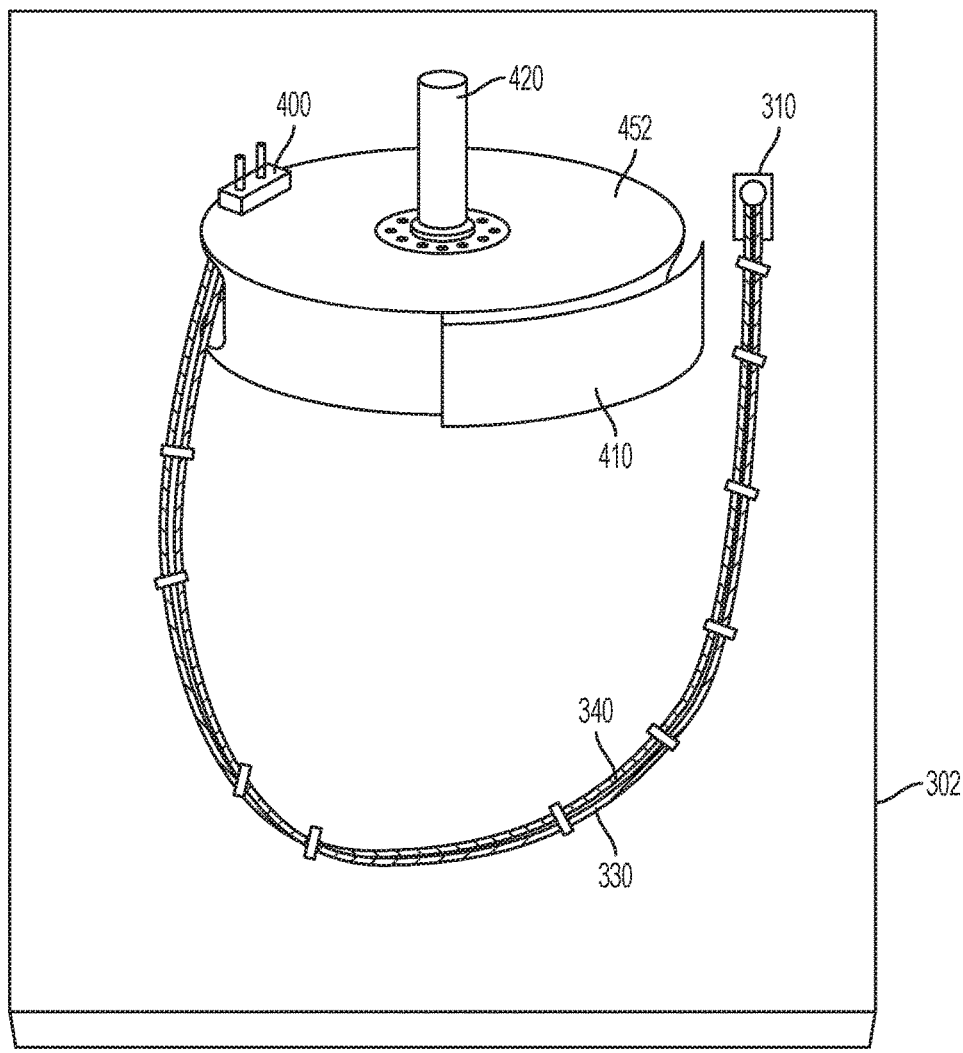
Figure 5C:
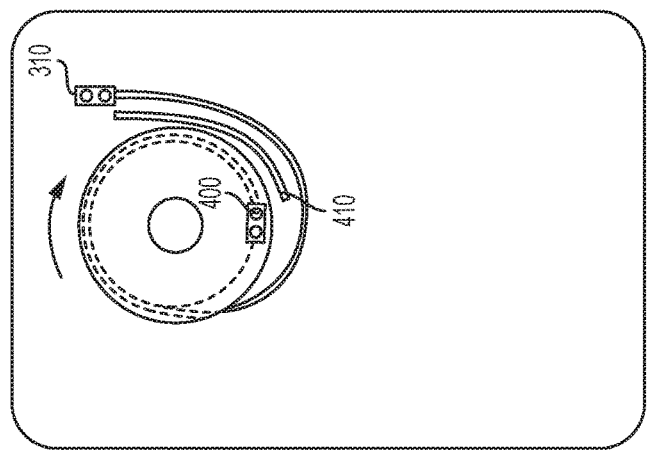
FIGS. 5A-5C illustrate the twist capsule rotary joint in operation.
Figure 5B:
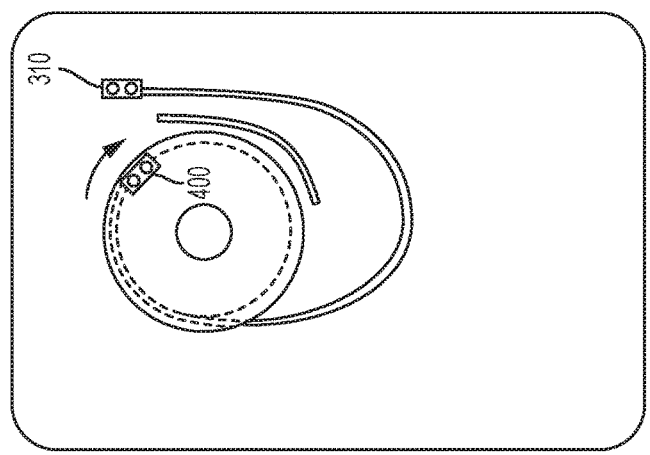
Figure 5A:
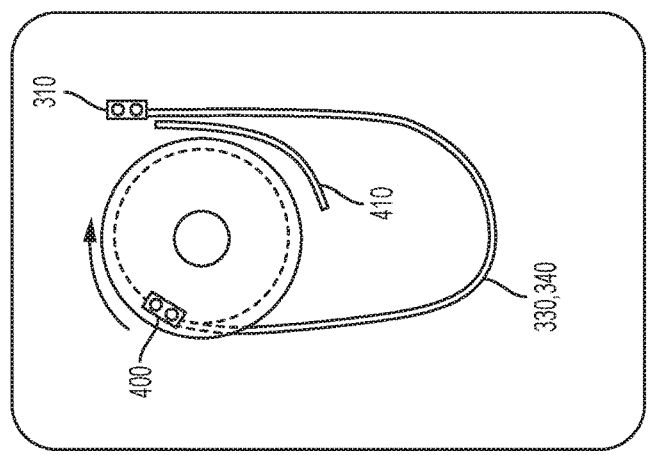

FIGS. 4A-4B illustrate an example of a twist capsule rotary joint. FIGS. 5A-5C illustrate the twist capsule rotary joint in operation.

As seen in the cross sectional view of FIG. 4A, a pressure hull 302 has an interior surface 304 facing the inside pressurized compartment of the spacecraft, and an exterior surface 306. A connector 310 extends through the pressure hull. In this example, the stationary connector includes two fluid passageways 312 and 314 for carrying supply fluid to the external radiator and return fluid from the external reflector, respectively. In this example, each of the passageways 312, 314 has an exterior connector fitting 315, 316 to which a flexible hose or line 330, 340 is attached. In this example, each passageway also has an internal connector fitting 318, 320 internal to the pressure hull.

Flexible high pressure hoses 330 and 340 are connected at a first, fixed, end to the through hull connector fittings 315 and 316, so fluid can flow through the hoses and through the hull. The connector fittings are static, and have no dynamic seal elements. Each of the flexible hoses 330, 340 has a second end that is attached to a connector that is fixed in place at a location on the top surface 452 of the rotating drum 440.

A motor and gear box, not shown, turn the drive shaft 420 in one direction then through the same angle in the opposite direction. A connector block 400 attached to the drum 440 follows this motion, pulling the attached end of the hose 330, 340 with it, so the hoses tighten around the rotating drum 440. As the drum rotates in the opposite direction, the hoses unwind, and the hoses extend away from the drum in the plane of the drum. The motion of the hoses and spindle assembly is illustrated in FIG. 5A 5C. FIG. 5A shows the drum rotating in a clockwise direction with the hoses 330, 340 at their most extended position. FIG. 5B shows the drum rotating in a clockwise direction with the hoses 330, 340 at an intermediate position, and FIG. 5C shows the hoses 330, 340 when the connector block 400 has pulled into a tighter position around the drum. A hose guard 410 can keep the hose portion near the fixed connector 310 away from the drum and away from the other end of the hose when the hose is wrapped around the drum. The hose guard can be a sheet of aluminum welded or otherwise attached to the base.

Note that the fixed end of the hoses at the through-hull connector 310 undergoes little or no twisting or bending as the spindle assembly turns. Further, the moving end of the hoses at the moving connector block similarly undergoes very little bending or twisting as the spindle assembly turns because the orientation of the hose end changes very little with respect to the connector block. The length of the hose experiences very little twisting, and the hoses themselves can experience only as much bending as is allowed by the diameter of the drum. In effect, the twist inherent in the 270 degree rotation of the spindle assembly to match the radiator steering angle is spread out over the entire length of the hose, so no part of the hose or connector experiences a detrimental amount of twist. Thus, the fluid can pass from the inside of the pressure hull to the outside of the pressure hull with using only static connectors with very little twisting or bending of the pressure lines. This eliminates the need for a conventional rotary joint with dynamic seals.

Line spacers 350 can be clamped in place at several locations along the length of the hoses. The line spacers to maintain the hoses at a distance away from the adjacent surfaces, to protect the hoses from rubbing against those surfaces. In this example, the line spacers are also configured to maintain the hoses at a preset distance from each other, to prevent the hoses from rubbing against each other.

Alternatively, the hoses can be enclosed in a protective cover that extends along the entire length of the hoses. A suitable material for the line spacers is a durable polymer suitable for use in vacuum, such as a polyamide available under the tradename VESPEL SP-3 by DuPont.

Referring again to FIG. 4A, it can be suitable to incorporate a cover 380 with a circular opening that surrounds the top surface of the rotating drum assembly. The cover can protect the mechanism and the hoses from debris and block sunlight from striking the hoses.

Figure 6:
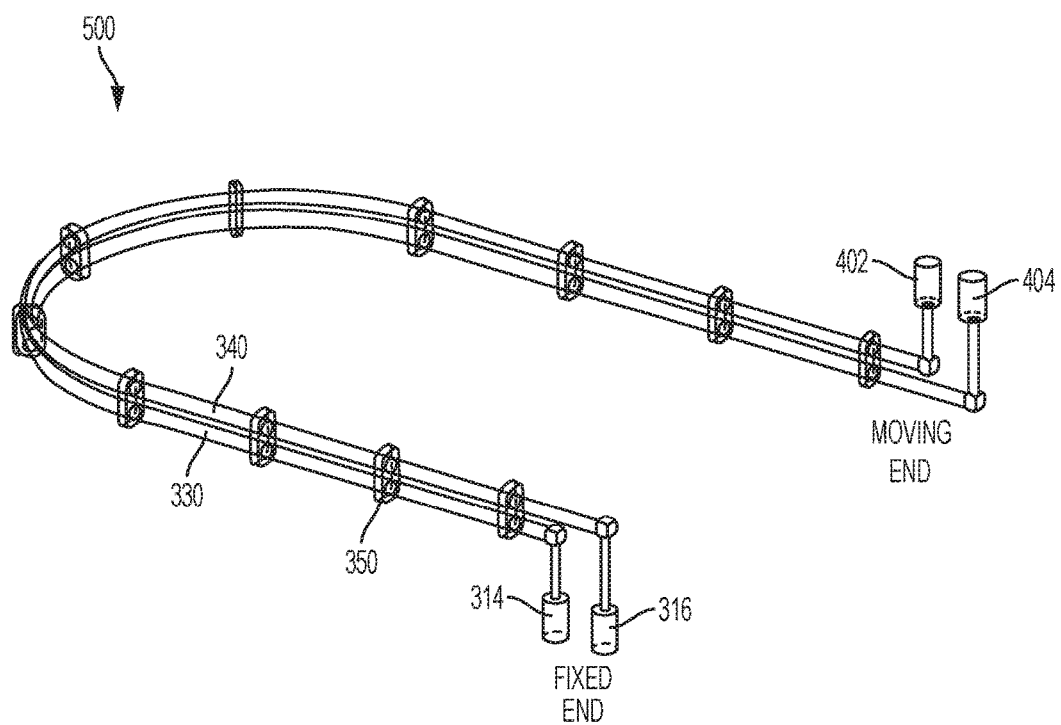
FIG. 6 illustrates a pressure line assembly 500 that includes the flexible hoses and line spacers.
Figure 7:
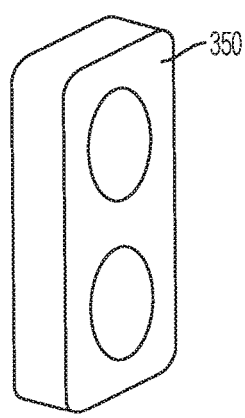
FIG. 7 illustrates a suitable line spacer for protecting the flexible hoses.

FIG. 6 illustrates a pressure line assembly 500 that includes the flexible hoses 330, 340 and line spacers 350, with the ends of the hoses attached to the connector fittings at each end. In this example, the high pressure hoses have a 321 stainless steel braid surrounding a 316 L stainless steel annular convoluted core and a 316 stainless steel end connection. One suitable high pressure line is available from Swagelok with part number SS-FL4TB4TB4. Each end of the pressure line has a welded Swagelok VCR fitting that can be capped once pressurized. FIG. 7 illustrates a suitable line spacer 350.

Figure 8:
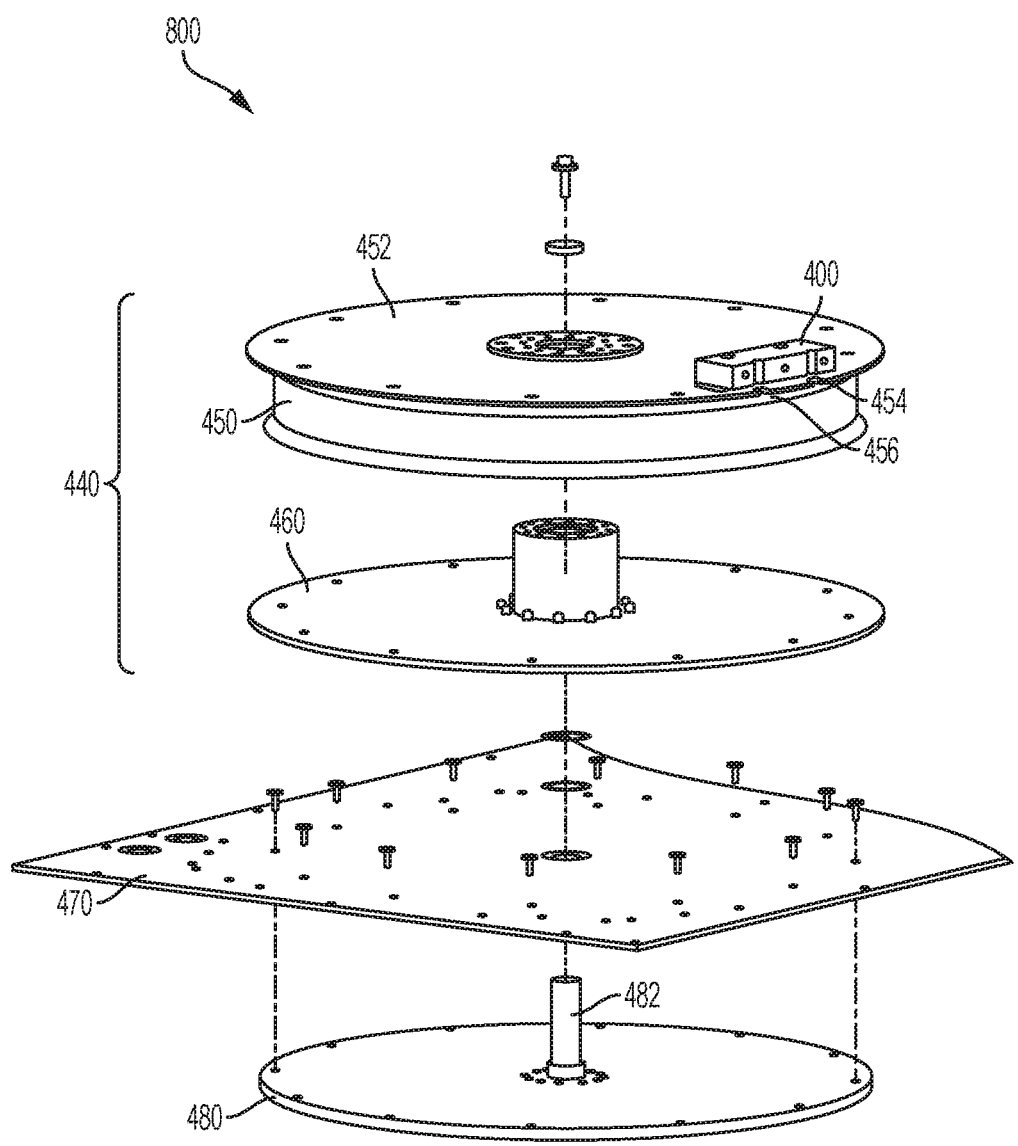
FIG. 8 illustrates an exploded view of a spindle assembly.
Figure 9:
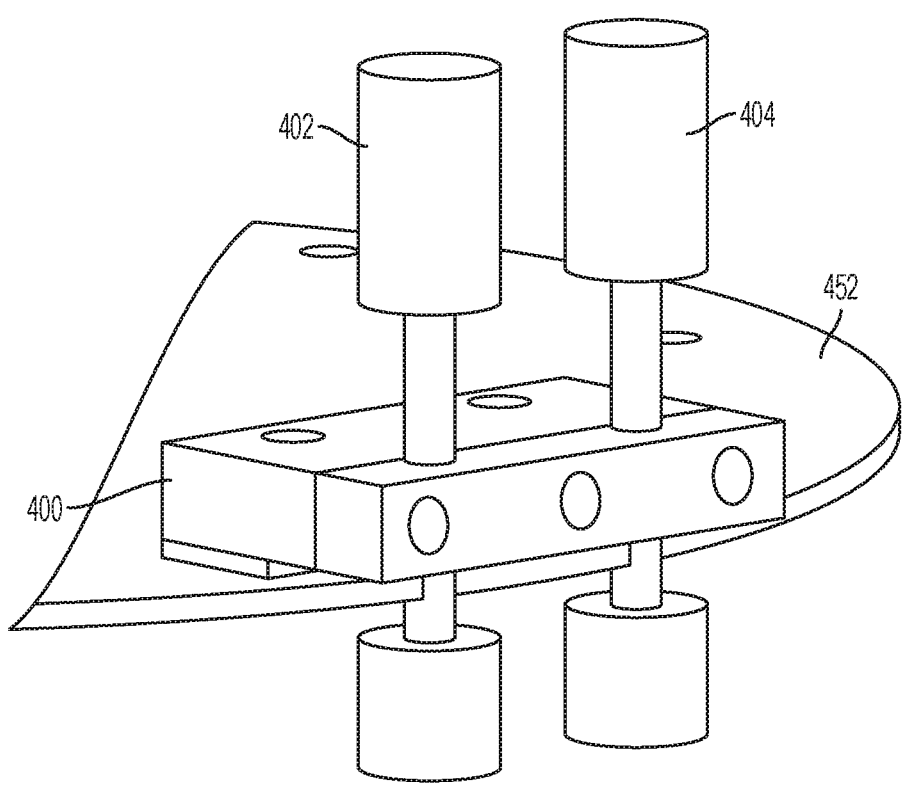
FIG. 9 illustrates a suitable connector block and connectors for attachment to the rotating drum top surface in more detail.

FIG. 8 illustrates an exploded view of a spindle assembly 800. The rotating drum 440 is formed of an upper reel support assembly 450 and a lower reel support assembly 460. A connector support block 400 is affixed near the outer circumferential edge of the top surface 452 of the drum. The circumferential edge of the top surface of the drum includes cut-away portions 454, 456 that allow the hose connector fittings 402, 404 to extend through the top 452 of the drum 440 and through the connector block 400. A flat plate or "floor" 470 is bolted to a spindle plate pre-assembly 480, which is in turn affixed to the pressure hull. The spindle plate pre-assembly includes a cylindrical spindle upon which the drum rotates. FIG. 9 illustrates one suitable connector block and connectors for attachment to the rotating drum top surface 452.

The drum 440 can be mounted on a pair of angular contact bearings. The contact bearings are sufficiently strong to withstand the loads experienced during the dynamic motion of the twist capsule. The rotating drum 440 is driven by a motor through a large angle. In one example, the motor is a high torque, integrated motor, controller, amplifier, encoder and communications bus. A gearbox allows for compensation of the large inertia changes seen throughout the pressure hose cycles.

The motor can be driven to oscillate through an angle range of 0 degrees to 270 degrees. In a prototype unit, the motor is a Moog Animatics SM34165DT model high torque motor, and the gearbox has a 50:1 ratio, and the motor is driven by SmartMotor interface software to oscillate through the desired angle range.

In this example, the spindle assembly, cover, and other components are formed of aluminum 6061 with a hard anodized coating. In one embodiment, the rotating drum is driven via a drive shaft by a SmartMotor 34165DT (not shown) and a reducing gear (not shown).

In some embodiments, the x-axis of the radiator support frame and the axis of the twist capsule system are collinear, so that as the radiator frame rotates, the outboard pressure line connectors 404 and 402 rotate with the radiator frame, keeping the outboard fluid lines aligned through the system's dynamic range.

The system can also include a control system for driving the motor. The control system will typically be configured as program instructions on a computer processor onboard the spacecraft, however, can also be operated remotely through a communications link. The control system can be integrated with the control system for the thermal control system, or can be separate. Feedback can be provided to the computer, including positional information from sensors that monitor the position of the radiators, global positioning satellite data, and temperature of the coolant at various points in the system, or other information.

In the example above, the movement of the rotating drum, and corresponding movement of the end of the hoses, is approximately 270 degrees, based on the particular geometrical movement necessary to turn the spacecraft radiator while the satellite is in orbit. It can also be suitable to have greater or lesser range of movement, depending on the application. Rotational movement through more than 360 degrees is also contemplated for other applications, by using different lengths of hose and different motor and controller instructions.

While particularly useful in the context of a steerable radiator for a spacecraft, the system described herein is also suitable for positional management of hoses that have a fixed end attached to a fixed location and an opposite end that would otherwise have a twisting motion due to attachment to a rotating shaft or other component with rotary motion. One example is delivery of a refrigerant line from the fixed body of a refrigerator to the moveable door of a refrigerator. In another example, the twist capsule system can be used for positional management of lines carrying signals to and from sensors positioned on outboard control surfaces of ships or aircraft.

The system described herein can also be useful in positional management of hoses or lines that carry other types of coolants or refrigerants. The hoses can carry substances other than fluid. For example, the lines can be conductive electrical power lines that carry electrical power, communication lines carrying electrical signals, or fiber optic lines carrying optical energy, among others. The hoses or lines can carry fluids in liquid or gas form, and can carry fluids other than coolants or refrigerants, including breathing gases, fuels, and industrial gases or liquids.

In the discussion above, the components of the system are described as being outboard of the spacecraft pressure hull. It is also contemplated that these components can be located inboard of the pressure hull. In other examples, the system can be configured at a bulkhead, wall, or other structure with equal pressure at both sides of the structure.

Control system components may be described in the general context of computer code or machine-usable instructions, including computer-executable instructions such as program modules, being executed by a computer or other machine. Generally, program modules including routines, programs, objects, components, data structures, and the like, refer to code that performs particular tasks or implements particular abstract data types. The control system can be independent of human input during operation, or can include a user interface to receive instructions from an operator. Computing devices can include a bus that directly or indirectly couples the following elements: memory, one or more processors, one or more presentation components, input/output (I/O) ports, I/O components, and a power supply. The bus may be one or more busses (such as an address bus, data bus, or combination thereof). Categories such as "workstation," "server," "laptop," "hand held device," etc., as all are contemplated within the scope of the term "computing device." Computing devices typically include a variety of computer-readable media. By way of example, and not limitation, computer-readable media may comprise Random Access Memory (RAM); Read Only Memory (ROM); Electronically Erasable Programmable Read Only Memory (EE- PROM); flash memory or other memory technologies; CDROM, digital versatile disks (DVD) or other optical or holographic media; magnetic cassettes, magnetic tape, magnetic disk storage or other magnetic storage devices, or any other tangible physical medium that can be used to encode desired information and be accessed by computing device. Memory includes non-transitory computer storage media in the form of volatile and/or nonvolatile memory. The memory may be removable, nonremovable, or a combination thereof. Exemplary hardware devices include solid state memory, hard drives, optical disc drives, and the like. Computing device includes one or more processors that read from various entities such as memory or I/O components. Presentation component can present data indications to a user or other device. I/O ports allow computing devices to be logically coupled to other devices including I/O components, some of which may be built in.

The Detailed Description has revealed the general nature of the present disclosure that others can, by applying knowledge of those skilled in relevant arts, readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art in light of the teachings herein.

What is claimed as new and desired to be protected by Letters Patent of the United States is:

1. A twist capsule rotary joint system for passing a fluid through a pressure hull, comprising:
    a rotating cylindrical member positioned outboard of the pressure hull adapted to rotate about an axis extending away from the pressure hull, and adapted to be driven in a reciprocating manner around that axis through an angle and backward through the same angle;
    at least one outboard pressure line having a first end attached to a fixed connector that extends through the pressure hull near and radially outward of the rotating cylindrical member; and a second end of the at least one outboard pressure line being attached to a connector that extends through a top outboard surface of the rotating cylindrical member; such that as the cylindrical member rotates in one direction, the at least one outboard pressure line wraps around the cylindrical member, and as the cylindrical member rotates in an opposite direction, the at least one outboard pressure line unwraps from the cylindrical member.

2. A twist capsule rotary joint system in accordance with claim 1,
    wherein the pressure hull is the pressure hull of a spacecraft, and
    wherein the at least one outboard pressure line comprises two pressure lines carrying two-phase coolant through the pressure hull to and from a steerable radiator that is adapted to be steered to an orientation with a minimum surface area toward the sun.

* * * * *